P. KESTNER.
APPARATUS FOR CONCENTRATING LIQUIDS.
APPLICATION FILED NOV. 1, 1909.
971,383.
Patented Sept. 27, 1910.
2 SHEETS—SHEET 1.
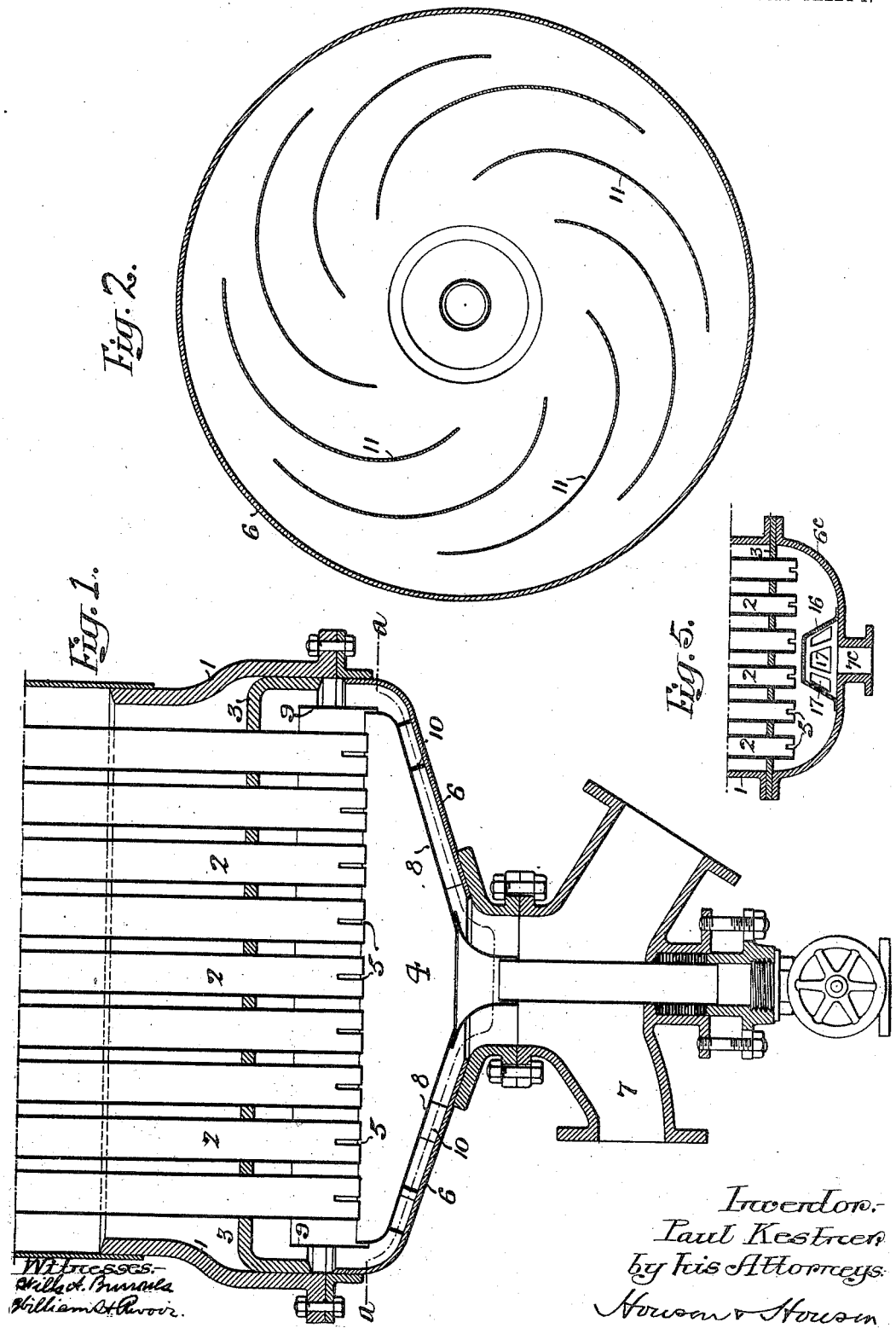

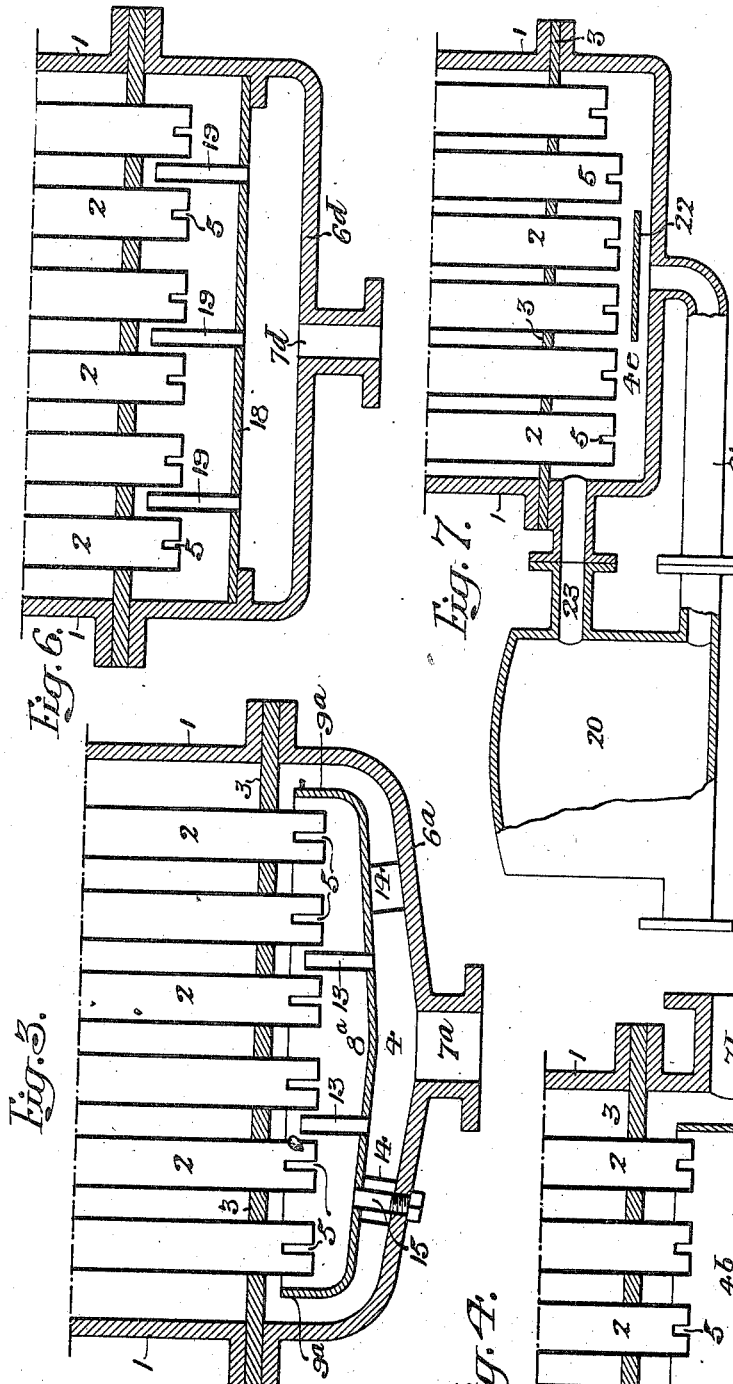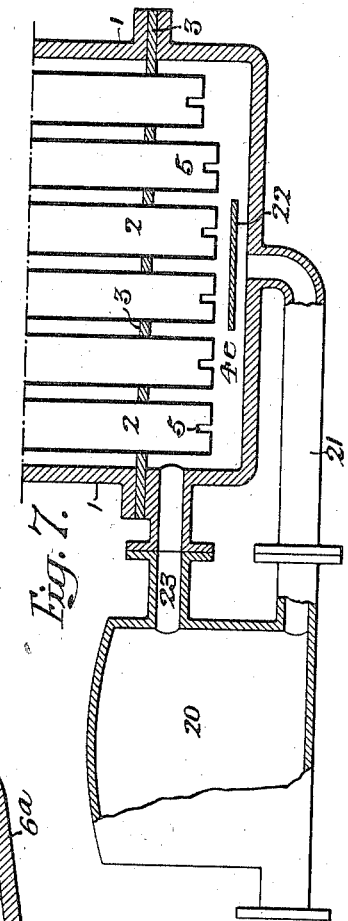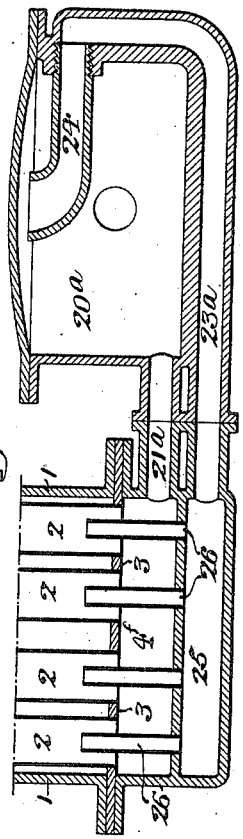

UNITED STATES PATENT OFFICE.

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

APPARATUS FOR CONCENTRATING LIQUIDS.

971,383.  Specification of Letters Patent. Patented Sept. 27, 1910.

Application filed November 1, 1909. Serial No. 525,710.

*To all whom it may concern:*

Be it known that I, PAUL KESTNER, a citizen of the Republic of France, and a resident of Lille, Department Nord, France, have invented certain Improvements in Apparatus for Concentrating Liquids, of which the following is a specification.

My invention relates to apparatus for evaporating liquids or liquid bodies, and the object of my invention is to provide improved means for feeding such liquids or liquid bodies to the base of vertical tube evaporators in which concentration or evaporation is effected by the climbing of the liquid within elongated tubes externally heated, that will insure an even and simultaneous feed to all the tubes of the liquid or liquid bodies and of accompanying vapor, giving a uniform feed of both vapor and liquid in each tube.

My invention is particularly applicable to evaporators of the Kestner type, and is fully shown in the accompanying drawings, in which:

Figure 1, is a vertical section of the lower part of one form of evaporating apparatus showing the application thereto of an improved feeding device embodying my invention; Fig. 2, is a sectional plan view of the same, taken on the line *a—a*, Fig. 1, and Figs. 3, 4, 5, 6, 7 and 8, are sectional views illustrating a portion of an evaporator and showing other forms of feeding devices embodying my invention.

In the operation of evaporators of the elongated vertical tube type, in which evaporation is effected by film climbing of the liquid or liquid body under treatment, the essential result to be attained is the feeding of said liquid or liquid body to all of the tubes simultaneously and uniformly, that is, a like amount of liquid in each tube. In evaporators of this type, the climbing film on the walls of the tube surrounds and is carried by a central core of vapor and it is very desirable to furnish some of this vapor in a performed state so as to initiate the climbing film as soon as possible. This is readily practicable with the later effects of a multiple effect apparatus and with the first effect where a preheater is employed. In supplying the tubes with both vapor and liquid it is desirable to effect an even and proportioned feed of both in each tube, each tube thereby receiving the same relative amounts of each. In a multiple effect apparatus, liquid coming from a previous evaporator is higher in temperature than the boiling point in the evaporator into which it is introduced, and the result is that the instant the liquid passes the feed valve into the second evaporator, the pressure being reduced due to the increased vacuum, the boiling point is reduced also and some of the liquid flashes into steam, causing the liquid to be filled with bubbles. It is very desirable that these bubbles of steam should be separated and fill the space directly below the tube sheet forming a distinct layer of vapor above the liquid. One reason for this is that it is desirable to have a uniform liquid level near the ends of the tubes so that the feed in each tube will be uniform; the steam entering the tube at the top of a slot or laterally presented orifice at the end of said tube and the liquid passing up the tube on the wall of the same. If this level of liquid is not uniform, or if there is a disturbance caused by the liquid entering at one side of the feed chamber, it will be readily understood that some of the tubes are apt to receive more liquid than others, while others receive more vapor, a condition that would interfere with the efficiency of the apparatus. Owing to the presence of this large amount of vapor due to a fall in temperature and pressure when the liquid is passed from a previous effect to the feed chamber of a second evaporator, there is always an opportunity for some tubes to receive a greater amount of liquid than others, and the essential object of my invention is to provide means whereby the liquid and its accompanying vapor may be controlled so that the entrance of the same to the several tubes will take place simultaneously with a substantially uniform volume of liquid and of vapor admitted to each tube.

The forms of feeding devices shown and described herein are intended to overcome the difficulties heretofore met with in feeding liquid or liquid bodies undergoing treatment to the base of evaporating tubes.

In Figs. 1 and 2, of the drawings, 1 represents the lower portion of a heating shell or casing shown as of the "climbing film" type and containing evaporating tubes 2 to which the liquid or liquid body under treatment is to be fed. Carried by this shell or casing 1 is a tube sheet 3 through which said tubes project downwardly into a feed chamber 4, as indicated, and these tubes may be provided with laterally presented orifices or slots 5 of the character shown and described in my prior patent No. 882,322; the function of these laterally presented orifices or slots being to enable the tube to tap both the liquid and the vapor layers simultaneously. Below the casing or shell 1, a dished member or plate 6 is secured, forming the bottom of the feed chamber 4, to which member 6 an inlet nozzle 7 is connected, and supported within the feed chamber above the dished member or plate 6 is a pan 8 having an annular wall 9 which extends above the lower ends of the tubes 2. Two inlet nozzles are shown, one of which may be capped when the other is connected to the usual delivery pipe supplying the liquid or liquid body to be concentrated; such construction permitting the use of right and left feed connections. The additional nozzle also permits simultaneous feed of liquid from another source, as where a return connection is desired. The height of this wall 9 may vary in some instances, and the ends of the tubes preferably project some distance into the feed chamber, and below the top of the wall 9; in evaporators of the usual size such projection being about eight inches below the bottom of the tube sheet, thus providing a large space for the circulation of the steam or vapor accompanying the liquid or liquid body undergoing concentration and a circuitous passage between the inlet and the tube ends.

The liquid or liquid body fed through the inlet nozzle 7 first enters a space 10 between the bottom of the feed chamber and the dished number 8, and with its accompanying vapor flows upward and passes the wall 9 of the latter into the dishing of said member 8 until the accumulating liquid formed as liquid and vapor separate and rise into contact with the tubes 2 when ascent within the same will take place, the steam or vapor which has entered with the liquid causing the latter to film in and wet the tubes, thereby facilitating the upward passage of the liquid and maintaining the filming of such liquid within said tubes.

The force with which the liquid enters the feed chamber is usually considerable and the force of the current in the absence of controlling means is apt to make the liquid level irregular thus giving more feed to some tubes than to others. The liquid may bank up at or near the point of entry or at a point more remote. With such a banking up, some tubes may take too much liquid to give a proper type of climbing film while others will run practically dry. By providing the dished or pan-like member, the distribution is made more uniform while still more advantageous results are attained by placing deflecting and circulating wings between the pan and the casing. Vanes 11 may be provided, disposed in the space between the bottom of the feed chamber and the dished member or pan 8, so as to form a series of curved paths for the incoming liquid and its accompanying vapor, which vanes serve to divert such liquid and vapor and give it a whirling motion, causing it to enter the pan circumferentially from a number of points; thereby securing an even flow for the same past the edge of the wall 9 which serves as a deflector plate. The practical result of this arrangement is the even introduction of the liquid into the feed chamber near the tube ends with a large proportion of bubbles, what is in effect an emulsion of the liquid and accompanying vapor and steam; a condition that facilitates evaporation of the liquid or liquid body under treatment in the tubes by insuring the proper wetting of the tubes and an even feed of the liquid thereto. The center of the pan 8 may be depressed at 12 and communicate with a drain outlet.

In the form of feeding device shown in Fig. 3, a dished member or pan $8^a$ is employed, over the annular wall $9^a$ of which the liquid overflows from the feeding chamber 4, to which it enters from a nozzle $7^a$, and in addition this member $8^a$ is provided with a series of tubes 13 in communication with the body of liquid and vapor entering below said member, which tubes extend to a point above the lower ends of the evaporating tubes 2. The dished member may be supported by lugs or by tubular members 14, and a drain passage 15 may be provided, which may pass through one of said supports. If desired, the space between the bottom $6^a$ of the feed chamber and the bottom of the dished member $8^a$ may be provided with curved vanes as in Fig. 1, to give a rotative or whirling movement to the liquid prior to its passing into said dished member $8^a$; further insuring an even feed of the same.

In the form of feeding device shown in Fig. 4, the evaporating tubes 2 project into a space in the feed chamber formed by an annular wall $9^b$, which may be secured to the bottom $6^b$ of the feed chamber and serves as a deflector against which the entering liquid strikes, and over which it passes with a substantially even flow until it rises to a height level with the lower ends of the tubes when feed to the latter will take place. The steam or vapor fills the upper portion of the feed chamber and enters the tube ends simultaneously with the liquid through the laterally presented orifices or slots 5.

In the structure shown in Fig. 5, the liquid enters through an inlet opening $7^c$ in the bottom of the feed chamber and strikes a deflector member 16 which stops the force of its flow; such member being apertured at 17 for the exit of the liquid and its accompanying steam or vapor. When such liquid fills the feed chamber until even with the lower ends of the tubes it will rise within the latter, previously wet by the accompanying steam or vapor.

In the structure shown in Fig. 6, the feed chamber is divided by a substantially horizontal partition 18, into two spaces. The liquid and vapor enter the lower one from a nozzle 7ᵈ and overflows into the upper space into which the lower ends of the evaporating tubes 2 project, through the pipes or tubes 19. These pipes or tubes extend into the steam or vapor portion of the upper space above the top of the notches or slots in the ends of the tubes.

In the structures shown in Figs. 7 and 8, provision is made for previously separating the liquid or liquid body from the steam or vapor which accompanies it when entering the apparatus. To accomplish this, a separate chamber 20 is provided, disposed adjacent the feed chamber which is in communication with the tubes, and provision is made for independent transfer of the liquid and of the steam or vapor to said feed chamber and therethrough to the tubes communicating therewith.

In Fig. 7, the liquid enters the chamber 20 separates more or less perfectly from the vapor and flows via a passage 21 to the feed chamber 4 into which the evaporating tubes 2 project, and strikes a deflector or baffle 22 therein which serves to spread the liquid to all parts of said chamber. The steam or vapor accompanying the liquid or developing within said chamber 20 rises to the top of the same and enters the feed chamber 4ᵉ via a passage 23 which leads from a point near the top of chamber 20, circulating around the upper portion of the feed chamber 4ᵉ simultaneously with the entry of the liquid therebelow and the latter wets the inner walls of the tubes 2 uniformly and simultaneously as the vapor enters such tubes; thus facilitating the flow of liquid thereto and concentration of the same.

The structure shown in Fig. 8, although designed to separate the liquid and vapor, differs somewhat from that shown in Fig. 7, in that provision is made for passing steam or vapor directly to the evaporating tubes 2. To this end, the incoming liquid and vapor pass into an auxiliary feed chamber 20ᵃ, and thence the liquid separated therein passes to a space 4ᶠ below the tubes 2, via a passage 21ᵃ, while the steam or vapor separated from said liquid within the auxiliary chamber enters a conduit 24 which communicates with a passage 23ᵃ leading to a space 25 below the feed chamber and from this space 25, the steam or vapor enters the evaporating tubes 2 direct through short sections of tubing indicated at 26. In this form of structure no provision is made for projecting the tubes into the feed chamber, but such is not thought to be necessary in view of the direct passage of the steam or vapor to the evaporating tubes.

With the projecting tubes, the laterally presented orifices or slots 5 will tap both steam and liquid layers, allowing a simultaneous entry of both in each tube, but with the structure of Fig. 8, positive means are provided for the delivery of liquid and of vapor into each evaporating tube and the beveling or slotting of the tube ends and their prolongation become unnecessary.

The several forms of distributing devices may be made of sheet metal or cast metal, or parts may be of sheet metal and parts of cast metal. The tubes may be projected into the feed chamber to any desired distance, such condition depending in some measure upon the size and capacity of the evaporating element. All of the feeding devices should preferably be provided with suitable drainage outlets, readily accessible and properly valved. In addition the feed chamber in each instance is so constructed and arranged, and of such size with respect to the shell containing the evaporating tubes, that all of said tubes are accessible when said feed chamber, or the lower portion of the same is removed.

The object to be attained is the control of the liquid and its accompanying steam or vapor so that the feed of the liquid and of the vapor to the evaporating tubes will be uniform and simultaneous.

I claim:

1. In a tubular evaporator, the combination of a feed chamber at the base of the tubes for receiving the liquid under treatment, evaporating tubes leading upwardly from said chamber, portions of said tubes extending into the same, an inlet for the liquid, and means interposed between said feed inlet and the extended ends of said tubes for facilitating the separation of steam or vapor from the liquid to facilitate an even flow and distribution of the same to the evaporating tubes.

2. In a tubular evaporator, the combination of a feed chamber at the base of the tubes for receiving the liquid under treatment, said liquid being accompanied by a large volume of steam or vapor, evaporating tubes leading upwardly from said chamber, portions of said tubes extending into the feed chamber, an inlet for said liquid, and means interposed between said feed inlet and the extended ends of said tubes for facilitating the separation of steam or vapor from the liquid prior to the entrance of the latter to the evaporating tubes.

3. In a tubular evaporator, the combination of a feed chamber at the base of the tubes for receiving the liquid under treatment, evaporating tubes leading upwardly from said chamber, portions of said tubes extending into the same, an inlet for the liquid, and an open topped pan surrounding the lower ends of the evaporating tubes, the incoming liquid overflowing the wall of said pan before gaining access to the tubes.

4. In a vertical tube evaporator, the combination of a feed chamber at the base of the tubes for receiving the liquid under treatment, evaporating tubes leading upwardly from said chamber, portions of said tubes extending into the feed chamber, an inlet for said liquid, a pan centrally disposed with respect to the feed chamber and surrounding the lower ends of the tubes, and a side wall in connection with said pan extending above the ends of the tubes so arranged that the incoming liquid overflows said wall before gaining access to the tubes.

5. In a tubular evaporator having a receiving chamber at its base, the combination of a casing forming said chamber, an inner shell separated from the wall of the chamber and forming a sub-chamber therein, and a series of evaporating tubes extending into the sub-chamber, said shell serving as a baffle to regulate the flow of the entering liquid.

6. In a tubular evaporator having a receiving chamber at its base, the combination of a casing forming said chamber, an inner shell separated from the wall of the chamber and forming a sub-chamber therein, a series of evaporating tubes extending into the sub-chamber, and means between said casing and shell for regulating the flow of the incoming liquid.

7. In a tubular evaporator having a receiving chamber at its base, the combination of a casing forming said chamber and forming a sub-chamber therein, an inner shell separated from the wall of the chamber, a series of evaporating tubes extending into the sub-chamber, and vanes located between said casing and shell for regulating the flow of the incoming liquid.

8. In a tubular evaporator having a receiving chamber at its base, the combination of a casing forming said chamber and forming a sub-chamber therein, an inner shell separated from the wall of the chamber, a series of evaporating tubes extending into the sub-chamber, and curved vanes located between said casing and shell and forming passages for the flow of the incoming liquid and serving to regulate and control the same and its accompanying vapor.

9. In a vertical tube evaporator, the combination of a receiving chamber at the base of the tubes for the liquid under treatment, evaporating tubes leading upwardly from said chamber and having portions extending into the same, an inlet pipe for the liquid, annular passages communicating with said inlet pipe and receiving chamber, and an annular wall in the receiving chamber surrounding the ends of the tubes over which the incoming liquid flows before it gains access to said tubes.

10. In a vertical tube evaporator, the combination of a shell or casing, a feed chamber at the bottom of the same having a suitable inlet, tubes disposed in said casing and having portions extending into said feed chamber, and a baffle plate disposed in said chamber opposite said inlet, said baffle plate providing for the gradual separation of vapor accompanying the liquid under treatment.

In testimony whereof, I have signed my name to this specification, in the presence of two subscribing witnesses.

PAUL KESTNER.

Witnesses:
HENRI CHARRIER,
LÉON PECKEL.